March 10, 1925.
S. E. RODLING ET AL
1,528,851
METHOD OF GRANULATING LIME NITROGEN
Filed Aug. 16, 1921
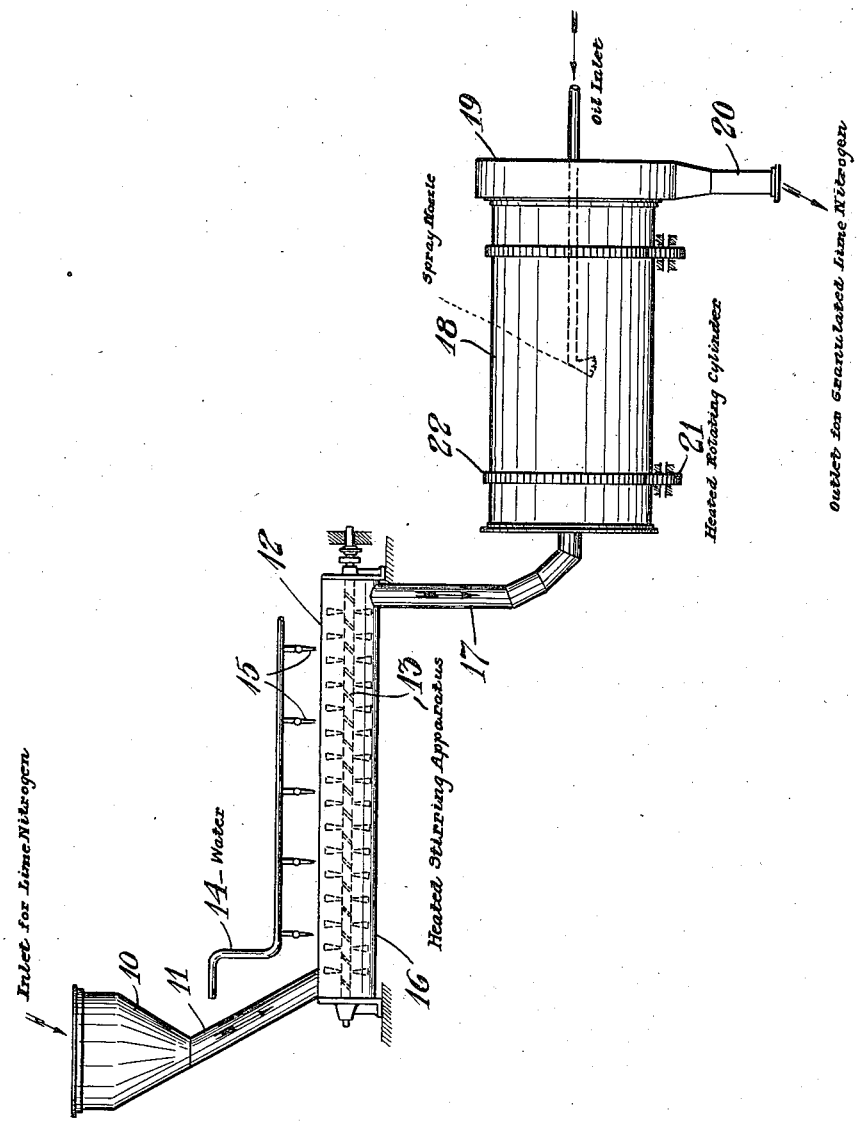
Inventors
S.E.Rodling
A.P.Zamore
By Markel Clerk
Attys.

Patented Mar. 10, 1925.

1,528,851

UNITED STATES PATENT OFFICE.

SALOMON EJNAR RODLING AND ADOLF PAULINUS ZAMORE, OF LJUNGA VERK, SWEDEN, ASSIGNORS TO STOCKHOLMS SUPERFOSFAT FABRIKS AKTIEBOLAG, OF STOCKHOLM, SWEDEN.

METHOD OF GRANULATING LIME NITROGEN.

Application filed August 16, 1921. Serial No. 492,805.

*To all whom it may concern:*

Be it known that we, SALOMON EJNAR RODLING and ADOLF PAULINUS ZAMORE, subjects of the King of Sweden, residing at Ljunga Verk, in Sweden, have invented certain new and useful Improvements in the Method of Granulating Lime Nitrogen, of which the following is a specification.

Lime nitrogen (calcium cyanamide) is, as is well known, a product which is obtained by heating calcium carbide in a nitrogen atmosphere and which is commonly used as a fertilizer. However, the product directly obtained by said process cannot, without great disadvantages, be utilized as fertilizer due to its dust-forming and corrosive action from which reasons it is dangerous to the labourers sowing the same over the ground. In order to make the lime nitrogen less dangerous one has proposed to expose the product to a treatment with water and other substances so as to transform the same into granules or pieces and remove its corrosive action. Hitherto, these attempts have not been successful since it has not been possible to obtain durable granules, but the granules have after storage for a few weeks, again fallen to a fine powder or have given off ammonia.

Our present invention has for its object a method of granulating lime nitrogen by which the granules obtained are durable and remain unaltered even after storage for many months and in other respects the product thus obtained is not dangerous or disagreeable to deal with.

Our present method is characterized in this that the lime nitrogen is continuously treated with water (alone or containing in solution an acid, such as nitric acid, or a salt, such as sodium bisulfate or sodium chloride), said treatment being executed, if desired, at a raised temperature, and that the mass thus treated is then granulated and dried in a rotating cylinder or other suitable apparatus, which may be heated, if desired.

The process can be carried out in an apparatus such as is shown in the annexed drawing, in which the figure represents a side elevation, partly in section, of an apparatus suitable for use in the process.

In said drawing 10 represents a hopper which communicates by spout 11, with the inlet end of a jacketed receptacle 12 carrying a conveyor 13, which latter serves to feed the material along and also to agitate the material and produce a complete mixing. This receptacle 12, can conveniently be open at the top and above the same is located a pipe 14 having a plurality of spray nozzles 15 directed downwardly, for spraying a liquid upon the material while the same is being agitated and pushed forward. This receptacle 12 may be provided with a steam jacket 16, having suitable inlet and outlet connections. 17 is a spout through which the wetted material is discharged into the drying drum 18, which may be a rotary drum provided at its outlet end with a stationary hood 19, from which the material falls through the spout 20. The drum is rotated in the well known manner by means of rollers 21, and a circular track 22, carried on the outside of the cylinder.

The following is an example of the practical executing of the method:

The lime nitrogen coming from the furnaces is ground to a fine powder and is then, together with a large quantity of liquid, fed into a conveyor worm, kneading apparatus or the like provided with oblique arms or wings which cause an intense stirring of the mass at the same time that the mass is slowly conveyed through the apparatus. The latter is provided with heating means, for instance a steam jacket, which at the same time makes it possible to regulate the temperature of the mass.

During its conveyance through the apparatus the mass is continuously exposed to the action of the diluted nitric acid. The liquid preferably ought to be heated, and in order to obtain the best results it ought to be supplied in a finely divided state for instance through spray nozzles. In this way the particles are uniformly treated with liquid and the intense stirring of the mass also contributes to this end.

The strength and the quantity of nitric acid or other liquid is dependent on different conditions and may, therefore, be varied within wide limits. As an example it may be set forth that a quantity of diluted nitric acid of, say about 25% of the weight of the lime nitrogen, generally gives good results. It is to be understood that this amount is given only by way of example. Simultaneously with or instead of the treatment with diluted nitric acid the mass can be treated with water.

After having passed through the conveyor and after having been exposed to the above treatment, the mass is fed into one or several rotating cylinders where the mass of lime nitrogen agglomerates so as to form small granules which are immediately dried in any convenient manner. This is performed in such a way that the cylinder is heated by means of steam, hot water, hot gases or hot air. For this purpose the cylinder may be provided with a steam, water or gas jacket, or the heated inert gases may be caused to pass through the cylinder, preferably in opposite direction to the mass. These two methods may also be used in combination, for instance in such a way that the cylinder is heated by means of a steam jacket at the same time as hot air is forced through the same in opposite direction to the mass thus removing any steam that has been generated within the cylinder. The heating of the cylinder may also be effected by electric current.

In order to still more diminish the formation of dust from the granules the latter may be treated with a fatty (greasy feeling) substance, such as heavy thick viscous lubricating mineral oil, which treatment may be executed in the rotary cylinder or afterwards. For this purpose the fatty substance is supplied through spray nozzles or the like, if necessary after having been heated to a sufficiently high temperature for maintaining the same liquid.

By treatment of the lime nitrogen with diluted nitric acid or other liquid in combination with the immediately following treatment and drying operation in a rotary cylinder the lime nitrogen is obtained as small granules which, as experience has proved, maintain their form and are thus not reduced to powder after a longer time's storage, and which are free from the disagreeable qualities of the original product.

After having passed through the cylinder or cylinders the lime nitrogen granules are fed into a bolter in which dust and big pieces are separated. The dust will be retreated together with other starting material in the above described manner while the big pieces are crushed and again sifted whereupon the products are treated as described.

The granulated lime-nitrogen obtained in the above described manner is very agreeable to deal with and not at all dangerous for the labourers. Moreover, it is a very good fertilizer.

We claim:

1. Method of granulating lime nitrogen, namely, calcium cyanamid, which comprises continuously treating pulverulent lime nitrogen, at an elevated temperature, with liquid while stirring, and thereafter granulating the mass while drying the same and keeping it in motion at an elevated temperature.

2. Method as set forth in claim 1, characterized by the treatment of the lime nitrogen with an acid liquid.

3. A method which comprises treating lime nitrogen with an aqueous liquid in amount sufficient to moisten the mass, while such mass is continuously agitated and continuously heated, and thereafter drying the mass and producing a granular product by continuously rolling the mass over upon itself while in a current of heated gases.

4. Method as set forth in claim 3 characterized by the fact that the mass during its granulation at an elevated temperature is exposed to the treatment with a greasy substance.

In testimony whereof we have affixed our signatures in presence of two witnesses.

SALOMON EJNAR RODLING.
ADOLF PAULINUS ZAMORE.

Witnesses:
AXEL EHRNER,
ELSA NILSON.